Jan. 9, 1962 T. L. BREWER ETAL 3,015,936
THRUST REVERSERS
Filed June 3, 1957 7 Sheets-Sheet 1

INVENTORS
THOMAS L. BREWER, JOHN L. HALL, PAUL M. CHEWEY
BY *Godfrey B. Spir*
ATTORNEY

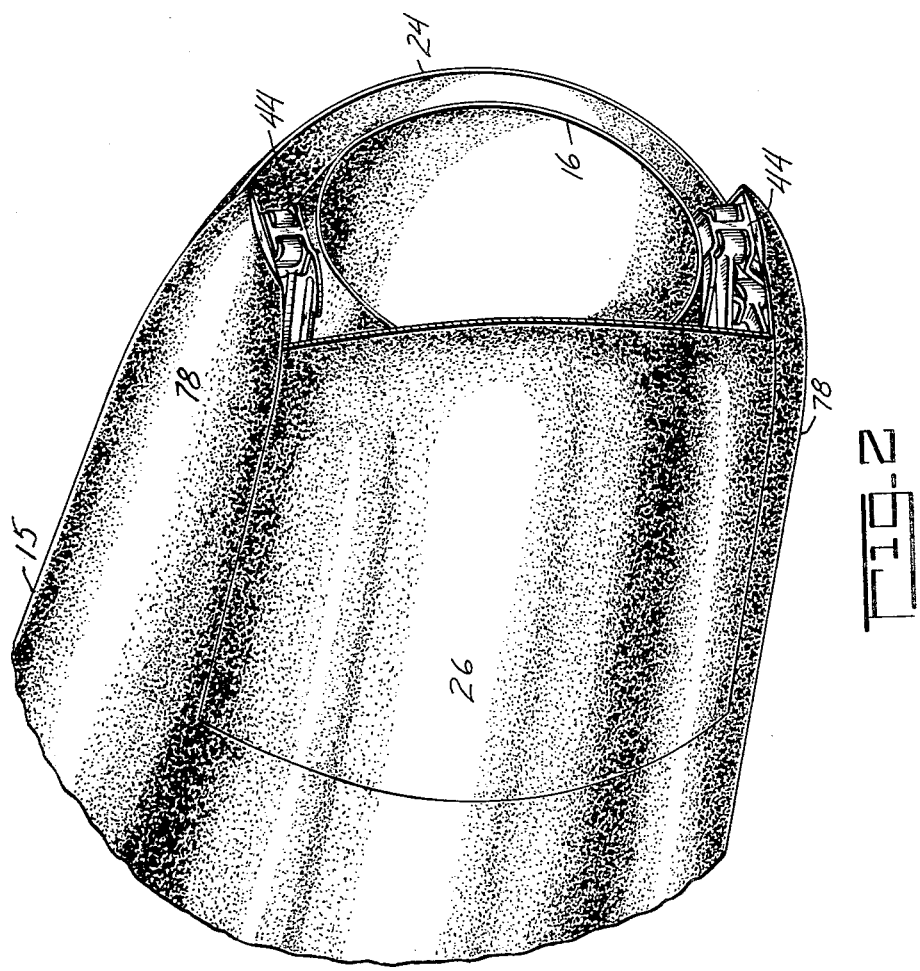

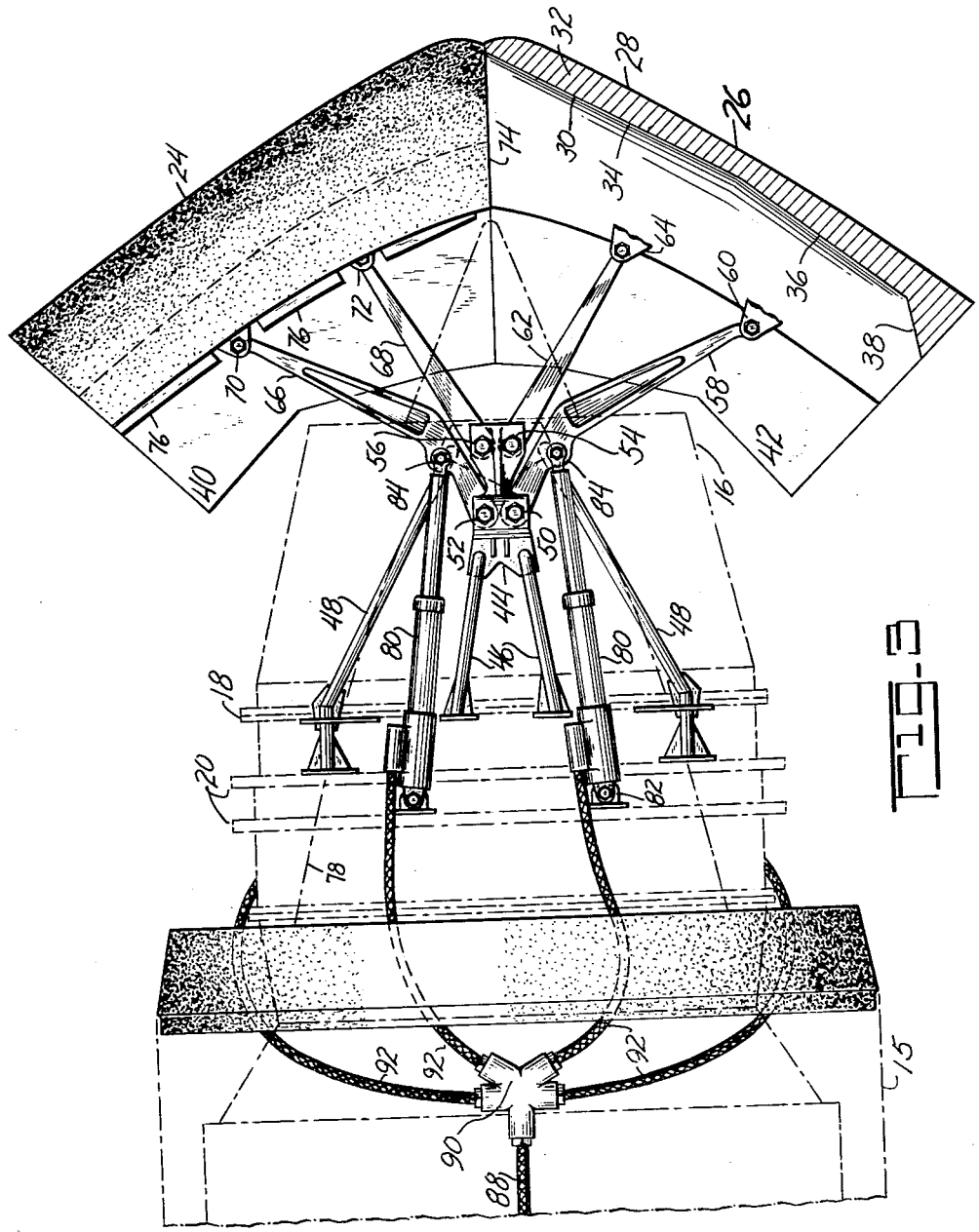

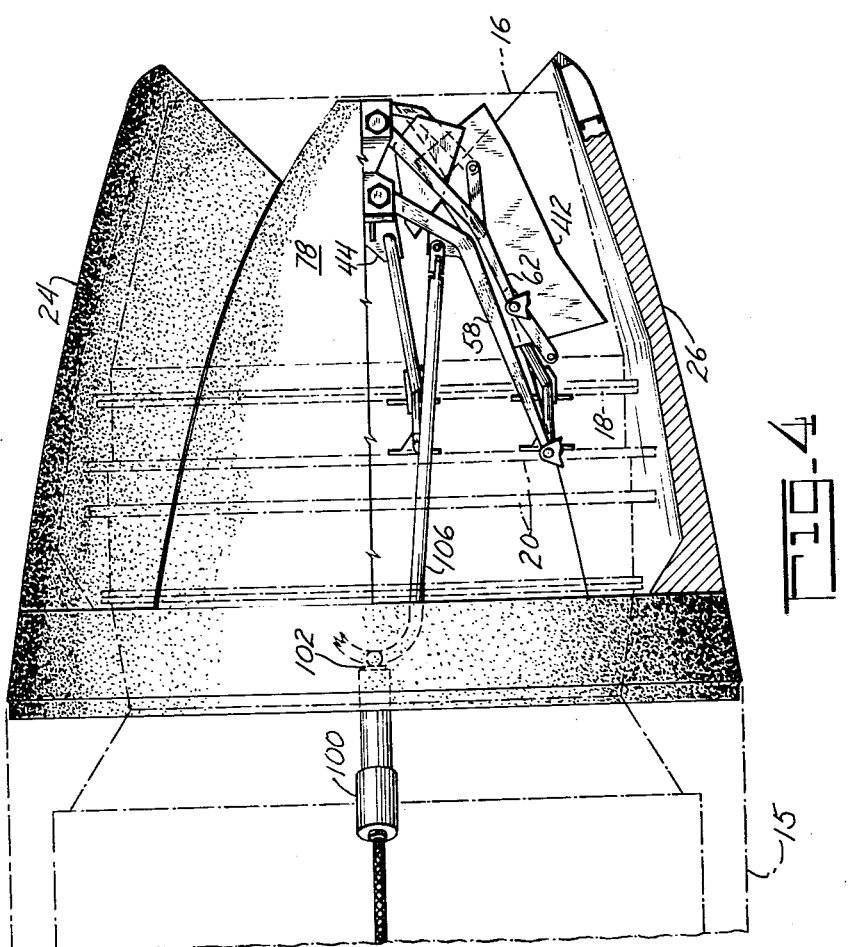

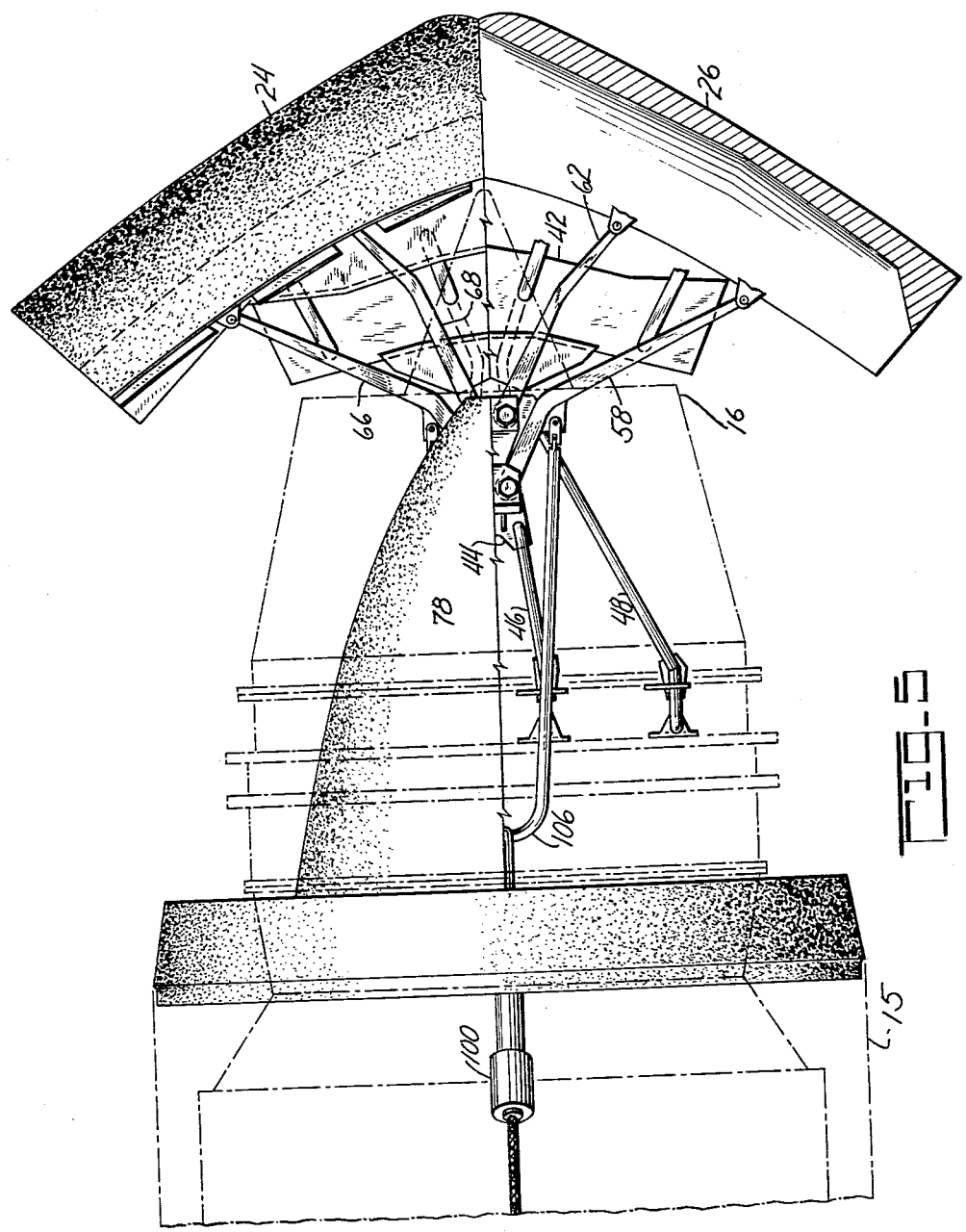

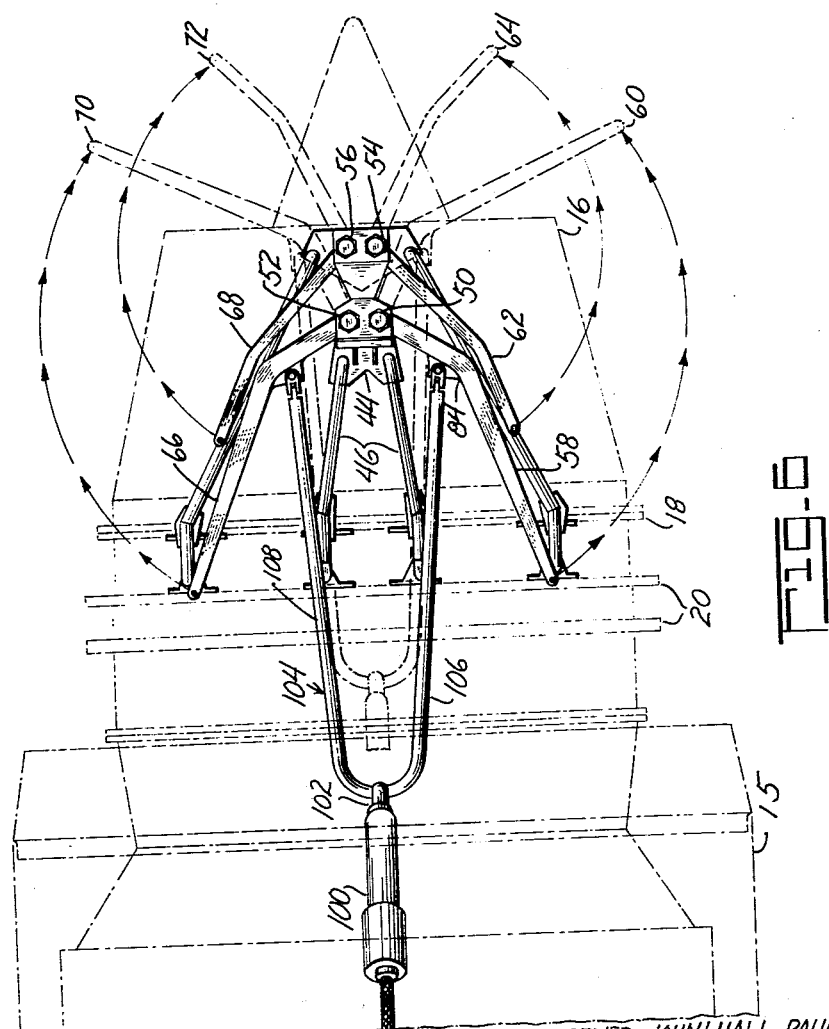

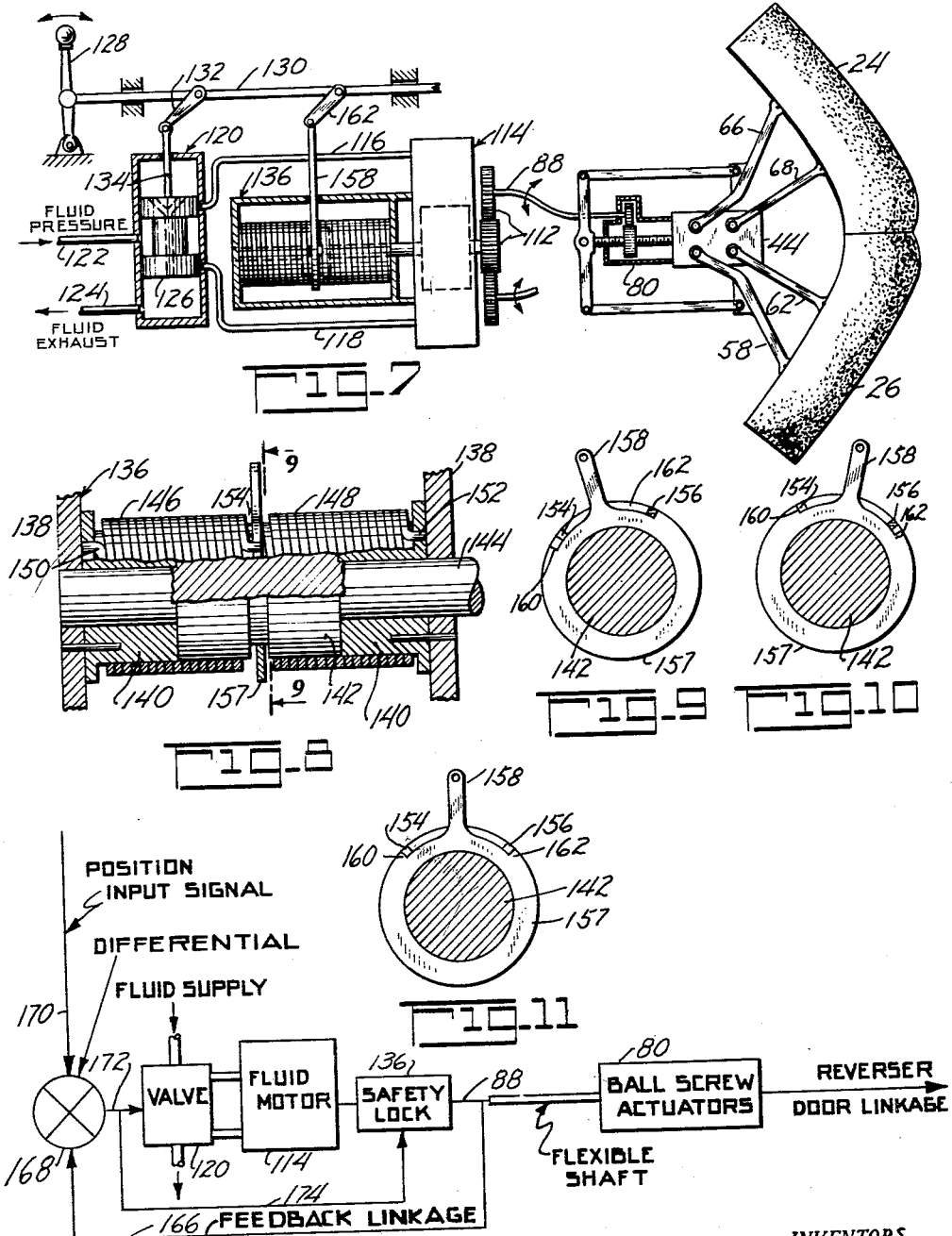

United States Patent Office 3,015,936
Patented Jan. 9, 1962

3,015,936
THRUST REVERSERS
Thomas L. Brewer, Ridgewood, John L. Hall, Hanover, and Paul M. Chewey, Belleville, N.J., assignors to Curtiss-Wright Corporation, a corporation of Delaware
Filed June 3, 1957, Ser. No. 663,048
2 Claims. (Cl. 60—35.54)

This invention concerns apparatus associated with the exhaust nozzle of a jet engine by which the jet stream can be diverted to reverse the direction of thrust. In addition, the invention relates to the means by which the same apparatus may be controlled to modulate jet engine thrust, regulating the force of the jet from full normal thrust to full reverse thrust.

Thrust reversing apparatus has been proposed heretofore. The present invention constitutes improvements over the previous devices, whereby to secure superior performance of the power plant and of the reverser. In addition, the present invention is based upon a realistic appreciation of the problems involved, including ruggedness of construction, minimum increase in weight, optimum thrust reversal effectiveness and simple and rugged control apparatus which renders the thrust reverser fail-safe in operation. In addition, the control apparatus is arranged to withstand the rather high temperatures to which the nozzle portion of a jet engine is subject.

A further feature of the invention includes the geometrical arrangement of the thrust reversing elements whereby, in case of failure of the control system, the reverser apparatus assumes a position to enable the development of substantially full forward engine thrust, enabling the aircraft to fly in a substantially normal manner regardless of the possibility of thrust reverser failure.

The foregoing advantages will be mentioned and further amplified as this specification proceeds. The particular nature of the invention may best be understood by reading the following detailed description in connection with the drawings, in which similar reference characters designate similar parts and in which:

FIG. 2 is a perspective elevation showing the thrust reverser in retracted or nested position to allow the engine to produce full forward thrust;

FIG. 3 is a schematic plan of the thrust reverser in full reverse position;

FIG. 4 is a plan of an alternative arrangement of the thrust reverser partly broken away and shown in the nested position for development of full forward thrust;

FIG. 5 is a plan of the arrangement of FIG. 4 with the thrust reverser in position for thrust reversal;

FIG. 6 is a diagram in plan of the arrangement of FIG. 4 illustrating the linkages by which the desired positions of the thrust reverser are established;

FIG. 7 is a diagram of a control arrangement applicable to either thrust reverser embodiment;

FIG. 8 is an enlarged elevation, partly in sections, showing part of the control mechanism of FIG. 7;

FIGS. 9, 10 and 11 are sections on the line 9—9 of FIG. 8, in different positions of adjustment; and FIG. 12 is a block diagram of the thrust reverser control apparatus adapted for modulating control.

Figure 1:
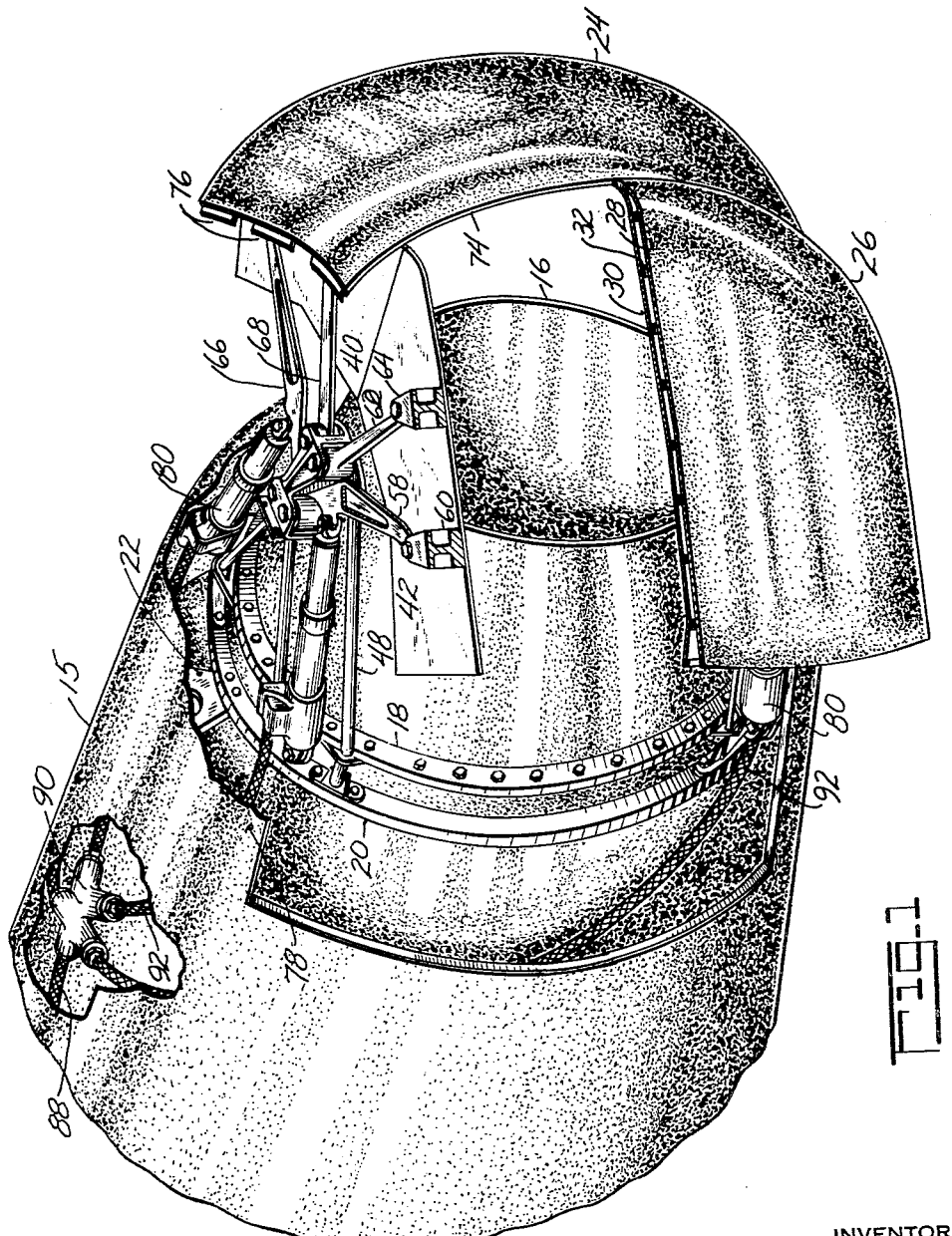
FIG. 1 is a perspective view, partly broken away, showing the thrust reverser in the position for full thrust reversal.

Referring first to FIGS. 1-3, the rearward portion of a jet engine nacelle is shown at 15, through which passes a nozzle or tail pipe 16 of the jet engine. Upstream of the rearward end, the nozzle 16 is provided with structural bands or rings 18 and 20 which are also secured to the nacelle 15 as at 22, these rings providing structural support for the thrust reverser assembly. The thrust reverser proper comprises a pair of doors 24 and 26, in the arrangement shown, symmetrical with respect to any chosen longitudinal plane through the axis of the nacelle. As shown, they are symmetrical with respect to a vertical plane. The plane of symmetry may be established at any desired angle in the fore and aft direction, to coordinate with the configuration of the aircraft to which the thrust reverser is applied. Various configurations of reverser doors are feasible, and symmetry though desirable in many installations, is not necessarily essential. Each door 24 and 26 comprises an outer shell 28 and an inner shell 30 secured together by appropriate internal structure 32. The outer shells 28 are so formed that when nested in the retracted position as shown in FIG. 2, they provide a streamlined prolongation of the nacelle 15. When they are extended as in FIGS. 1 and 3, the external form of the outer shells is not significant, but the configuration of the internal shells 30 becomes very important. As shown in FIG. 3, the internal shells, when the thrust reverser is extended, comprise three or more relatively angled portions 34, 36 and 38, the portion 34 being reversely angled relative to the normal direction of thrust, to receive the jet stream from the engine nozzle 16 and to turn it outwardly and forwardly. The next portion 36 is set at a forward angle relative to the portion 34 and the next portion 38 is set at a still greater angle in a forward direction to the portion 36. Thereby, as the jet stream impinges on the reverser doors, it is progressively diverted from a rearward direction to a forward direction, issuing finally in a forward and outward direction from the portion 38 of the outer shell of the reverser doors. The portions 34, 36 and 38 may be blended into one another by curves, or may comprise a smoothly curved surface.

The doors 24 and 26 are curved in cross section as is clear in the drawings so that when extended, they tend to issue confined jet streams symmetrically in a forward direction on opposite sides of the nacelle. The lateral spread of these streams substantially prevents the streams from entering the space between the nacelle 15 and the outside of the nozzle 16. The reversing divided jet stream thrust produced effectively provides reverse thrust on the nacelle and consequently on the aircraft to assist in slowing the aircraft on landing or, if desired, in slowing aircraft descent.

To further confine the reversed jet stream and to minimize its dispersion, baffle plates 40 and 42 are secured to the reverser doors just above and just below the nozzle 16. These baffle plates extend from front to back of respective doors 24 and 26 and extend forwardly, when the doors are extended, a sufficient distance to minimize flow loss at the top and bottom of the doors as shown. Likewise, these plates are so formed as to move with the doors when they are retracted, to nest in the space between the nacelle 15 and the nozzle 16, and to close against each other when the doors are fully extended. The doors have an effective embracement on each side of the nozzle 16 of approximately one quadrant. On reversal of jet flow, the other two quadrants at the top and bottom as shown are occupied by the plates 40 and 42 and by the supporting and operating linkages for the doors. The plates 40 and 42 serve also to isolate the reversed jet stream from the supporting and operating linkages. They are desirable in some installations, and may be omitted in others.

As best shown in FIG. 3, the doors are mounted on swinging links pivoted to support pads 44. The pads are secured at their forward ends by struts 46 to one of the structural rings 18. Further support is provided by struts 48 from the rearward ends of the pads 44 to the ring 18 and to the ring 22, these struts being angled relative to one another to firmly hold the pads 44 in position against possible lateral movement. Each pad 44 is provided with four pivot points spaced from one another, there being two forward pivot points 50 and 52 spaced equally on opposite sides of the plane of symmetry. Two rearward pivot points 54 and 56 are also spaced equally on opposite sides of the plane of symmetry.

A swinging arm 58 connects the forward pivot point 50 with a pivot bracket 60 on one reverser door, toward its forward end. An arm 62 connects the pivot point 54 with a pivot bracket 64 on the reverser door toward its rearward end. In like fashion, arms 66 and 68 respectively connect pivot points 52 and 56 with pivot brackets 70 and 72 on the other reverser door. These arms, pivots, and brackets lie above the baffle plates 40 and 42 as shown in FIG. 1, and are duplicated on the opposite or lower side of the thrust reverser assembly. The geometry of the links and pivots is so organized, as shown, that when the doors are in the retracted position they nest as a continuation of the rearward end of the nacelle as shown in FIG. 2, and extend to the angled positions shown in FIG. 1 and 3. The doors, at the rearward ends, are formed to meet and contact one another as at 74, so that there is little or no leakage of the jet stream between them when the doors are in their extended positions. When the doors are extended the engaged ends thereof preferably lie rearward of the end of the nozzle by a distance equal to at least 80% of the nozzle diameter.

The doors are also provided with tabs 76 along their upper and lower edges which register with and engage upper and lower rearward extensions of the nacelle 15. These extensions 78 cover a major portion of the reverser supporting arms previously described when the aircraft is in normal flight, to avoid the drag which otherwise might be caused by these arms and links.

By the lateral spacing of pad pivots 50 and 52, 54 and 56, impact of the jet stream on the reverser doors tends to spread the doors apart. Should the locking arrangements, to be described, for the reverser doors become inoperative or fail the supporting arrangements for the doors will permit them to spread apart and to allow the issue of the jet stream between them, producing forward thrust. The doors are spread until there is a balance between the jet impact forces on the rearward ends thereof, and the air stream impact forces acting on the outer or forward portion of the doors which are exposed to the normal air stream resulting from aircraft flight. This balance is controlled to a considerable extent by the geometry of the supporting linkage and is pre-established by design so that approximately 50% to 80% of engine thrust will be realized for forward propulsion should there be a failure of reverser door control which would permit the doors to flap or move uncontrollably. This renders the reverser substantially fail-safe, minimizing the possibility of a catastrophe resulting from loss of reverser control and from loss of engine thrust.

In FIGS. 1–3, control of the reverser doors is secured by a plurality of linear actuators 80, the forward ends of all actuators being pivotally secured as at 82 to the structural nozzle ring 22. The rearward end of one actuator connects to a pivot 84 on the arm 58 and the rearward end of another actuator is connected to the arm 66. Other actuators connect the corresponding other two arms on the opposite side of the reverser. The actuators 80 are jointly operated by a single power connection 88 leading to a divider unit 90 from which flexible power connections 92 lead to the several actuators. Preferably, but not necessarily, the actuators 80 are ball screw devices, known in the art, and the connections 88 and 92 are flexible shaft drives. The divider 90 comprises a gear unit by which the power from the connection 88 is uniformly divided and transmitted to the connections 92. Thus, all actuators 80 operate in unison and cause symmetrical movement of the reverser doors 24 and 26 between extended and retracted positions.

Reference may now be made to FIGS. 4–6 in which the majority of the components of the thrust reverser are generally similar to those described. Reference characters used in FIGS. 1–3 are applied to similar components in FIGS. 4–6. A description of these components will not be repeated; only the different components will be described.

In FIGS. 4–6, a single actuator 100 is secured to nacelle structure in the plane of symmetry at the top of the assembly, and a similar actuator 100 is secured in the plane of symmetry at the bottom of the assembly. The two actuators are operated concurrently by a single power source, through a power divider having two outlets and similar in general to the power divider 90 previously described. The output or movable end of each actuator 100 is provided with a substantially U-shaped yoke 104, one limb 106 of the yoke leading directly to the pivot 84 on the arm 58 and the other limb 108 of the yoke leading to the corresponding pivot of the arm 66. Through this arrangement, extension or retraction of the linear actuators 100 jointly and concurrently shifts the thrust reverser doors between extended and retracted positions in the fashion previously described.

Reference may now be made to FIG. 7 which shows a control arrangement applicable to either of the reverser configuration described and shown with respect to a slightly modified version of a reverser actuating system. The motor and control part of the system are shown at the left hand side of FIG. 7, and the reverser doors and actuators are shown toward the right hand part of the figure. The doors 24 and 26 are extended or retracted by the actuaor 80 as previously described, rotary power for the actuator being secured from the flexible drive shaft 88 which is driven by output gearing 112 from, preferably a pneumatic motor 114 preferably of the vane or positive displacement type. Fluid supply and exit for the motor 114 is provided by conduits 116 and 118 leading thereto from a control valve 120. The valve 120 is connected to a fluid pressure supply 122 and to a fluid exhaust 124. A spool 126 in the valve 120 can be raised or lowered to connect the fluid pressure supply 122 to either of the conduits 116 or 118, the non-pressurized conduit being concurrently connected by the spool 126 of the fluid exhaust 124. Operation of the valve 120 may be accomplished by a manually controllable handle 128 connected to a control rod 130 carrying an angled pivoted link 132 which is pivoted to a valve stem 134 connected to the spool 126. As the handle 128 is moved to the left, the valve 120 connects fluid pressure to the conduit 118 and fluid exhaust to the line 116. This motion serves to energize the motor 114 to extend the thrust reverser doors. Rightward movement of the lever 128 reverses the connections, operating the fluid motor to retract the reverser doors. When motion of the reverser doors is not wanted, at the extremes of reverser door movement, the doors are locked in the position selected. This locking is accomplished by a spring brake assembly 136 which is released if reverser door movement is called for and which is set in the braking position when reverser door movement is not called for. FIGS. 8–11 show this spring brake mechanism in sufficient detail for understanding.

The brake comprises a housing 138 to which are secured cylindrical elements 140. Between the elements 140 is another, centrally grooved cylindrical element 142 which may be integral with a shaft 144 directly connected to the driven shaft of the motor 114. A spring coil 146 is wrapped around the left end portions of elements 140 and 142 and a spring coil 148 is wrapped around the right end portion of elements 140 and 142. The left end of coil 146 is secured against rotation to the housing 138 as at 150, and the right end of coil 148 is secured against rotation as at 152. The inner ends of both coils are bent over as at 154 and 156 respectively. A ring 157 is disposed in the center groove of element 142 and is provided with a handle 158 and notched portions 160 and 162.

As the ring 158 is moved leftwardly as in FIG. 9 the coil end 154 is left free for contraction of the coil 146 for one-way locking purposes, but the end 156 of the coil 148 is picked up by the end of the notch 162 and is moved slightly to unwind the coil 148 from its co-acting members, enabling rotation of the element 142. In so rotating the element 142 slips in one direction relative to the coil 146, the latter acting as a one-way brake. In FIG. 10 the ring has been moved in a clockwise direction, leaving the end 156 and its coil 148 in one way locking position, but moving the end 154 of the coil 146 so that the coil 146 unwraps from the elements 140 and 142 to leave the element 142 free to rotate.

The stem 158 of the ring is pivotally connected to a slanting link 162 which in turn is pivotally connected to the rod 130. When the rod 130 is moved to the right or left the appropriate braking coil 146 or 148 is unlocked from the motor shaft leaving the motor free to be operated in the appropriate direction by fluid pressure. The arrangement of FIG. 7 and the control features so far described are for a non-modulating system, wherein the control handle 128 is pushed in one direction to retract the reverser doors, and left there, and is pushed in the other direction to extend the reverser doors, and left there. Assume a leftward position of the handle 128 for normal thrust, and a rightward position for reverse thrust. If the system is normal and reverse thrust is wanted, the handle 128 is pulled to the right. This pulls spool 126 up pressurizing conduit 116 and starting motor 114 to extend doors 24 and 26. Concurrently, stem 158 is pulled up, assuming the position of FIG. 10, releasing brake coil 146 through abutment 160 and coil end 154 allowing the motor shaft to rotate for reverser door extension. The clutch coil 148 allows this rotation. As the doors reach the extended position, clutch coil 148 and fluid pressure on the motor combine to hold the doors extended. If either should fail, the other continues to act. Upon retraction of the doors, the same sequence occurs in opposite sense. Assuming a failure in fluid power while the doors are locked in extended positions, the doors may nevertheless be returned to their retracted positions, if desired, by moving the handle 128 to the left to release the spring brake 136 whereupon the doors are returned to retracted positions by the force of engine exhaust.

While the drawings and above descriptions related to fluid motor and valving means to control reverser operation, the invention is not limited to fluid motor apparatus. It is considered to be within the scope of those skilled in the art to utilize other suitable motor means, such as electric motors, hydraulic motors or mechanical transmission apparatus and clutching means whereby driving power for the thrust reverser doors may be derived from the jet engine or from other continuously operating motor devices.

FIG. 12 shows, in block form, the same general type of apparatus as disclosed in FIG. 7. The principal subassemblies in FIG. 12 bear the same reference characters as are used in FIG. 7. However, FIG. 12 includes a position feedback linkage 166, transmitting the position of the reverser doors as established by the position of the drive connection 88 to a differential 168. This differential may be a conventional mechanical gear differential having two inputs and one output, the connection 166 comprising one of the inputs. The other input 170 is a desired position input which may be controlled by a lever such as 128 in FIG. 7. The differential output as 172 operates the valve 120 and consequently the motor 114. A connection 174 is also led from the differential output 172 to the safety lock or braking device 136. This arrangement enables the control lever to be set at any position between thrust reverser doors open or closed. If the position is different from that at which the thrust reverser doors are set, a motion signal is transmitted to the differential 168 through the feedback connection 166 and when the doors attain a position corresponding to that called for by the input signal, the valve 120 is closed and the doors become locked in the desired position. The safety lock in this embodiment is similar in general to that shown in FIGS. 8–11, except that, in any set position of the reverser doors—that is, when the valve 120 is "off" and the output of differential 168 is neutral, the safety lock is disengaged in both directions. This is accomplished as shown in FIG. 11 by positioning the abutments 160 and 162 to engage and press on coil ends 154 and 156. This provides a dead zone for slight drift of reverser door position when no change in reverser door position is called for. Should the doors depart from the set position by a slight amount, the position change is passed through feedback connection 166 to the differential 168, this in turn passing a correction signal to the motor and to the safety lock 136. As the connection is applied to the safety lock, the lock stem 158 is moved, holding one of the coil ends 154 or 156 disengaged but allowing the other coil ends 156 or 154 to lock on the cylinder 142 to prevent further drift in reverser position. The scope of the tolerable dead zone thus produced is readily controllable by suitable design of the component mechanisms. This sort of control array is desirable, in particular, for a modulating type of thrust reverser wherein it may be desired to position the reverser doors in some intermediate location to provide thrust between full positive or negative jet engine thrust. The modulating type of thrust reverser is desirable in some aircraft as it can be used to regulate thrust much more quickly than it can be regulated through operation of the engine fuel control mechanism, particularly where substantial changes in the speed of the rotating system of the jet engine are required. Thrust may be changed by the reverser doors without reference to the relatively great time lag required for a change in engine speed.

A number of variations in the application are feasible in addition to those shown and described, and are within the scope of the invention. For example, the reverser may be mounted on aircraft structure rather than on engine or nacelle structure. Some of the figures show an engine tail-pipe plug or nozzle area control and it is feasible to use the reverser in conjunction with variable area exhaust nozzle of several types. It is also within the scope of the invention to provide means to snub the reverser doors to prevent their slamming open or closed. This may be accomplished by various means, such as by providing resilient bumpers which engage and deflect upon door opening or closing, or by reversing fluid flow to the operating motor at chosen points in door travel just before the doors reach limiting positions.

A further point worthy of mention is that the relatively angled liner parts of the reverser doors, at 30, 36 and 38, or the alternative curves suggested at these points, is desirable to improve flow stability of the jet stream reversal. Were these liners arranged in a straight path, unstable vortices and flow can occur.

While our invention has been disclosed in several presently preferred embodiments, modifications and changes may be made therein without departing from the spirit or scope of the invention. We aim in the annexed claims to cover all such changes and modifications.

We claim:

1. Thrust modulator means for a jet engine having a substantially circular downstream fluid ejection nozzle, comprising pads on opposite sides of said nozzle near its rearward end and secured to said engine; four substantially rectangularly arranged pivots on each said pad; an arm swingable on each pivot; two substantially semi-cylindrical segmental doors disposed around said nozzle, two of the arms from each pad being pivoted to each said door at spaced apart pivots thereon, said doors being swingable on said arms between a retracted position wherein the doors' cylindrical axis is substantially coincident with the nozzle axis and an extended position wherein the near edges of the doors meet on the nozzle axis and diverge forwardly and outwardly therefrom, the forward edges of said doors being spaced outwardly from said nozzle and said doors being sloped relative to the nozzle axis; translating means acting between an arm of each door and said engine selectively operable to move said doors between retracted and extended positions; and substantially flat baffle plates disposed on both sides of said nozzle and secured to said doors between said swingable arms and said nozzle, and movable with the doors, said baffle plates substantially bridging the gap between said nozzles end and the lateral margin of said doors and shielding said arms from reversed gases.

2. A thrust reverser for a jet engine having a jet discharge nozzle, comprising a pair of doors of substantially semi-cylindrical segmental form, said doors when in a position for normal thrust being nested around opposite sides of said discharge nozzle, and when in a thrust reversing position being extended rearwardly and angularly from the nozzle to receive and divert laterally and forwardly the jet stream from said nozzle; rigid pad structure on opposite sides of said nozzle and between said doors; forward swingable arms pivoted to said pads at their one ends and pivoted to forward parts of said doors at their other ends; rear swingable arms pivoted to said pads rearwardly of said first pad pivots at their one ends and to rearward parts of said doors at their other ends; and linearly extendable actuators secured at their one ends to said engine having their outer ends pivotally connected to the forward arms at a location intermediate the ends thereof; and substantially flat baffle plates disposed on both sides of said nozzle and secured to said doors between said swingable arms and said nozzle, and movable with the doors, said baffle plates substantially bridging the gap between said nozzle end and the lateral margins of said doors and shielding said arms from the reversed gases.

References Cited in the file of this patent
UNITED STATES PATENTS

| | | |
|---|---|---|
| 2,220,599 | Galter | Nov. 5, 1940 |
| 2,570,624 | Wyckoff | Oct. 9, 1951 |
| 2,570,847 | Ovens | Oct. 9, 1951 |
| 2,596,203 | Bridwell | May 13, 1952 |
| 2,620,622 | Lundberg | Dec. 9, 1952 |
| 2,688,232 | Geyer | Sept. 7, 1954 |
| 2,715,312 | Brame | Aug. 16, 1955 |
| 2,724,462 | Henley | Nov. 22, 1955 |
| 2,735,264 | Jewett | Feb. 21, 1956 |
| 2,757,510 | Holloway | Aug. 7, 1956 |
| 2,784,810 | Ulmann | Mar. 12, 1957 |
| 2,799,249 | Lear | July 16, 1957 |
| 2,847,823 | Brewer | Aug. 19, 1958 |

OTHER REFERENCES

Serial No. 362,677, G. Jagliano (A.P.C.), published May 18, 1943.

Driggs: Abstract of appl'n. Serial Number 45,381, published June 10, 1952, 659 O.G. 590.